Jan. 8, 1963    G. E. DRAKEFORD ETAL    3,072,171
PNEUMATIC TYRES

Filed April 14, 1960    2 Sheets-Sheet 1

George Edward Drakeford
Roy Desmond Winstanley
INVENTORS

Benj T. Rauber
their attorney

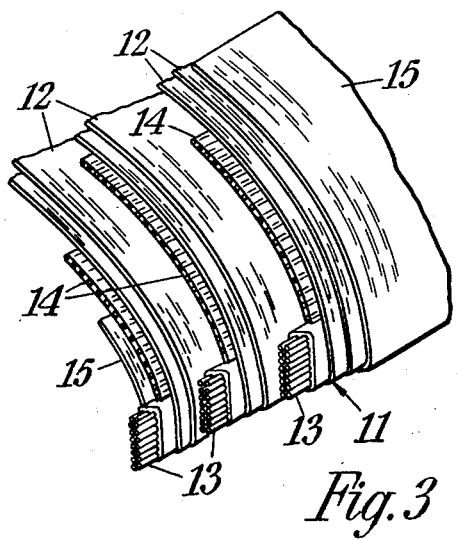
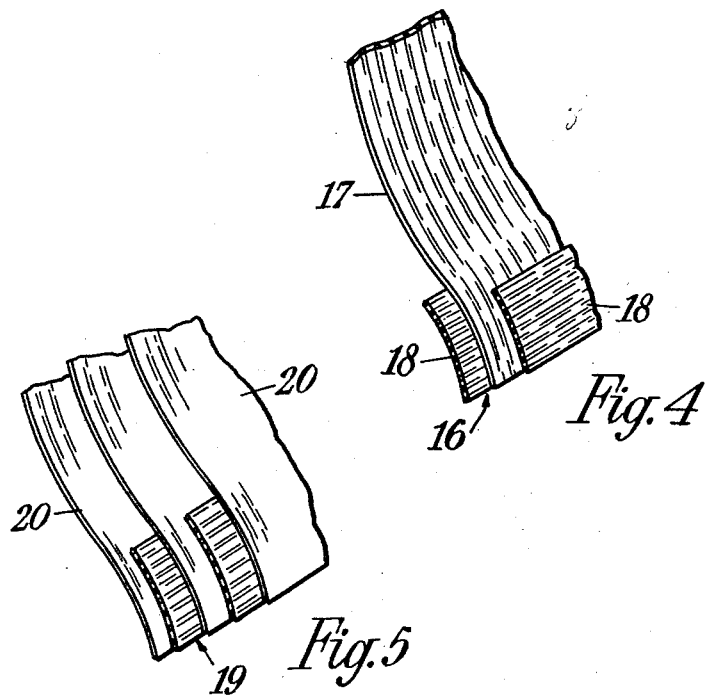

United States Patent Office 3,072,171
Patented Jan. 8, 1963

3,072,171
PNEUMATIC TYRES
George Edward Drakeford, Walmley, Sutton Coldfield, and Roy Desmond Winstanley, Edgbaston, Birmingham, England, assignors to Dunlop Rubber Company Limited, London County, England, a British company
Filed Apr. 14, 1960, Ser. No. 22,155
Claims priority, application Great Britain May 8, 1959
10 Claims. (Cl. 152—362)

In the conventional pneumatic tyre the plies of cord fabric forming the body of the casing are wrapped around the bead wires, and fillers, also constituted by cord fabric, are provided at the beads. This construction has the disadvantages that the inflation pressure of the tyre tends to pull the bead off the wheel rim and that the deflection of the tyre causes pounding on the upper edges of the fillers.

A pneumatic tyre according to the invention comprises a carcass having at least one ply which extends across the tread region of the tyre and down the sidewalls terminating short of or at the bead base, and at least one annular disc-shaped filler in each bead region, formed from filamentary material, the filamentary material extending circumferentially around the disc-shaped filler in a plurality of convolutions, the convolutions being parallel to one another and lying in side-by-side relationship.

Normally the filamentary material in the filler is steel, although in the case of very low pressure tyres, e.g. some cycle tyres, textile cord may be used.

The cords in the ply layers of the carcass may either be of textile material or steel.

In addition, small bead wires may be provided to give bulk in the beads during shaping of the unvulcanised tyre, these bead wires being disposed beneath the spirally wound fillers, at the side of the casing ply or plies without being directly attached to the plies.

The spirally wound fillers provide the strength required at the beads of the tyre and the coils are loaded in tension, through the intervening rubber, by the plies when the tyre is inflated. Preferably the rubber compound between the fillers and the plies is of 70 to 90 Shore hardness.

The tyre may also be strengthened, especially in the case of a giant tyre, by the addition of a bracing strip in the interior of the casing extending throughout the bead region and radially outwardly beyond. This bracing strip provides additional resistance to bending and is preferably formed from steel cords running at 90° to a line drawn circumferentially of the tyre at the point under consideration, but the cords may also run at an angle of between 45°–90° to that line.

Embodiments of the invention will now be described, by way of example, with reference to the accompanying drawings in which:

FIGURES 2, 3, 4 and 5 are views similar to FIGURE 1 showing further embodiments of the invention.

Figure 1:
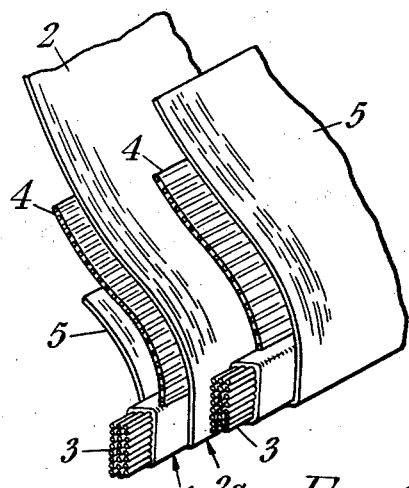
FIGURE 1 is a diagrammatic isometric view, cross-sectioned in steps, of one bead region of a tyre carcass, looking towards the interior surface of the tyre.

In the embodiment shown in FIGURE 1, each bead region 1 of a giant pneumatic tyre comprises one carcass ply 2, a pair of bead wires 3, a pair of annular fillers 4 and a bracing strip 5.

The ply 2 is of steel cords disposed at 90° to a mid-circumferential line of the carcass. The ply extends across the tread region and down each sidewall of the tyre and terminates near the base 2a of the bead. The bead wires 3 are disposed side-by-side at the same radial distance from the axis of rotation of the tyre and lie one on each side of the ply 2.

The annular fillers 4, one for each bead wire 3, are disc-shaped, and each filler is formed from a single length of rubberised steel cord wound in a plurality of spiral convolutions, which are parallel to one another and lie in side-by-side relationship, to form the filler. Each filler 4, extends radially outwardly from the radially outer surface of its associated bead wire 3 into a sidewall of the tyre.

The bracing strips 5, one in each bead region are each composed of a layer of rubberised parallel steel cords, the cords of which are disposed at an angle of 90° to a line drawn circumferentially of the tyre at the point under consideration. Each bracing strip, is wrapped around a bead base and extends on one side adjacent to the interior surface of the casing and partly up the otherside adjacent to the exterior surface of the casing.

Figure 2:
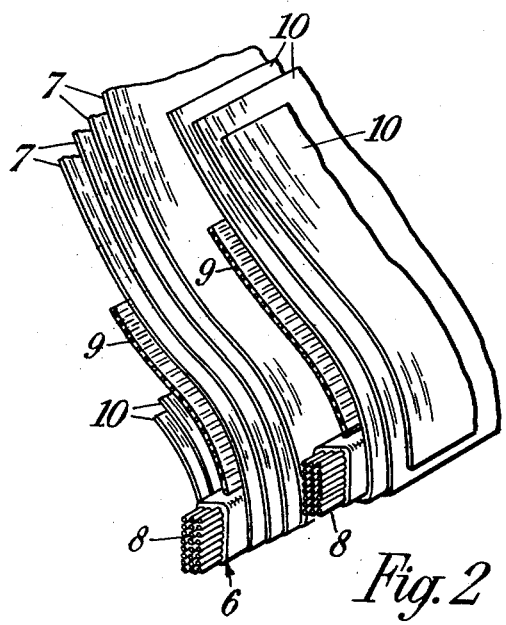

In the embodiment shown in FIGURE 2, each bead region 6 of a giant pneumatic tyre comprises four carcass plies 7 of rubberised textile cords, and three bracing strips 10. The construction is otherwise the same as that shown in FIGURE 1 with the exception that two only of the three bracing strips are wrapped round the bead wires 8.

In the embodiment shown in FIGURE 3, a bead region 11 of a pneumatic tyre comprises three bead wires 13, six carcass plies 12 of rubberised textile cords, two between each bead wire and two adjacent to the interior surface of the carcass, three fillers 14, one for each bead wire 13, and a bracing strip 15. The construction is otherwise the same as that shown in FIGURE 1.

The embodiments shown in FIGURES 4 and 5 are concerned with motor car tyre constructions as opposed to giant tyre constructions, and no bead wires and bracing strips are used.

In the construction shown in FIGURE 4, each bead region 16 comprises one ply 17, and two fillers 18 the ply and fillers being of rubberised steel cords.

The ply 17 extends across the tread region and down the sidewalls of the tyre and terminates near the base of each bead region. The ply cords are disposed at an angle of 90° to a line drawn circumferentially of the tyre at the point under consideration. The two fillers 18 are of the same material and are formed in the same manner as the ones in the preceding embodiments and are positioned one on each side of the ply 17.

The construction shown in FIGURE 5, is the same as that shown in FIGURE 4 with the addition of two extra plies 20, one on each side of the assembly illustrated in FIGURE 4.

The tyres according to the invention have the advantage that the turning up of the lower ends of the plies is eliminated and that the edges of the fillers are continuous, instead of being constituted by the ends of a number of spaced cords. The steel fillers are put under tension and are thus used to the best advantage. Moreover, especially where the fillers are of relatively large diameter, a substantial area of the tyre is able to withstand the shear forces due to inflation so that high inflation pressure may be used.

Having now described our invention—what we claim is:

1. A pneumatic tyre comprising a carcass having at least one annular disc-shaped bead reinforcement in each bead region formed solely from rubberized filamentary material extending circumferentially around the tyre at the bead region in a plurality of adjacent, spiral, convolutions, the radially inner convolutions at least being within said bead region and at least one ply of reinforcement of rubberized cords extending across the tread region and down the sidewalls of the tyre into adhesive contact with one side of said disc-shaped reinforcement and terminating at said side of said reinforcement with which it is in contact with said bead region.

2. A pneumatic tyre according to claim 1 wherein the filamentary material is steel cord.

3. A pneumatic tyre according to claim 1 including at least one bead wire in each bead region.

4. A pneumatic tyre according to claim 3 which includes at least one bracing strip in each bead region extending from the toe region of the bead radially outwardly up one side of the casing adjacent to the interior surface thereof, each bracing strip being formed of a layer of rubberised parallel cords.

5. A pneumatic tyre according to claim 4 wherein each bracing strip is wrapped round the bead base and extends radially outwardly adjacent to both the inner and outer surfaces of the bead region.

6. A pneumatic tyre according to claim 5 in which the cords of the bracing strip are each disposed in a radial direction with respect to the axis of rotation of the tyre.

7. A pneumatic tyre according to claim 6 in which the rubberised cords of said bracing strip are steel.

8. A pneumatic tyre according to claim 3 having at least two annular disc shaped reinforcements in each bead region and one bead wire in each bead region for each said annular disc-shaped reinforcement, each said reinforcement extending from its associated bead wire outwardly into a sidewall of the tyre.

9. The pneumatic tyre of claim 4 in which the bracing strip of each bead wire is wrapped around its bead wire.

10. The pneumatic tyre of claim 9 having at least two bead wires in axially adjacent positions and in which the bracing strips are wrapped around the assembly of bead wires.

References Cited in the file of this patent

UNITED STATES PATENTS

| | | |
|---|---|---|
| 2,006,315 | Hopkinson | June 25, 1935 |
| 2,186,178 | Shoemaker | Jan. 9, 1940 |
| 2,501,372 | Benson | Mar. 21, 1950 |
| 2,822,018 | Perdriau | Feb. 4, 1958 |
| 2,958,360 | Macklem et al. | Nov. 1, 1960 |